Oct. 23, 1928.

N. L. GULLIFORD 1,688,385

WOODWORKING MACHINE WITH TUBULAR CUTTER

Filed March 19, 1926

Inventor:
Nicholas L. Gulliford,
by Emery, Booth, Janney & Varney
Attys.

Patented Oct. 23, 1928.

1,688,385

UNITED STATES PATENT OFFICE.

NICHOLAS L. GULLIFORD, OF PEABODY, MASSACHUSETTS, ASSIGNOR TO GREGORY & READ COMPANY, OF LYNN, MASSACHUSETTS, A CORPORATION OF MASSACHUSETTS.

WOODWORKING MACHINE WITH TUBULAR CUTTER.

Application filed March 19, 1926. Serial No. 96,042.

This invention relates to woodworking machines and in particular to those utilizing tubular cutters. The object of the invention is to provide certain improvements in machines of this nature adapting them to the rapid production of accurate work. I have herein shown as an example of my invention a machine utilizing a tubular saw and adapted to perform the breasting operation on wooden heels of the type commonly called Cuban heels.

My invention will best be understood by reference to the following description of the illustrative embodiment thereof shown in the accompanying drawings, wherein.

Figure 1:
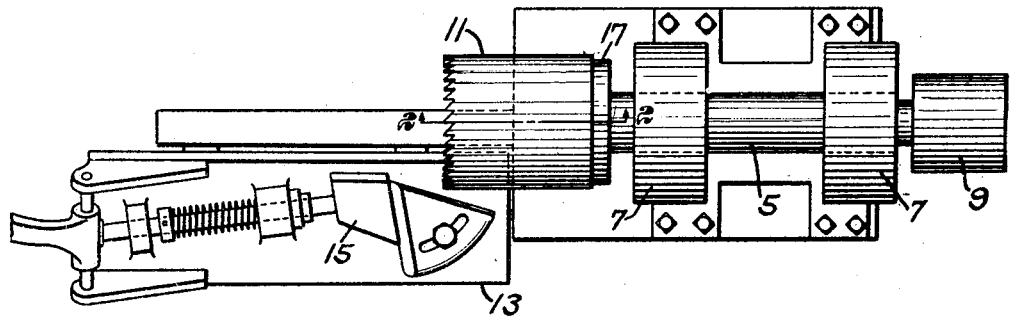
Fig. 1 is a plan of a heel breasting machine.

Referring to Fig. 1 of the drawings, the machine there shown embodies a suitable power shaft 5 turned in the bearings 7 by the drive pulley 9 and on the end of which is mounted the tubular saw or barrel saw 11. A slide 13 is adapted to reciprocate parallel to the axis of shaft 5 and has mounted thereon a suitable clamp for receiving the heel blank 15. As the slide 13 is moved toward the right in Fig. 1, the rotating saw cuts out the breast of the heel forming a segmentally cylindrical groove in the face thereof, suitable means being provided for cutting away the waste portion of the blank at the concave side of the kerf.

The idea of utilizing a tubular saw to perform the breasting operation on wooden heels is not in itself new but the machines hitherto tried have been unsatisfactory and they did not turn out work of a satisfactory quality or operate with sufficient rapidity.

Figure 2:
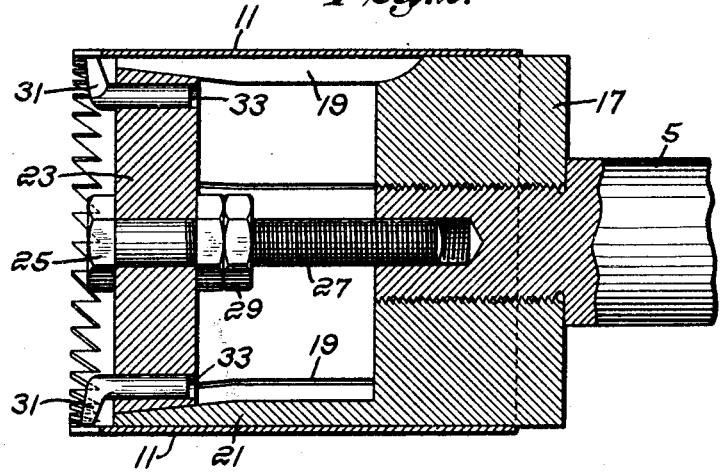
Fig. 2 is a section on the line 2—2 of Fig. 1 on an enlarged scale.

Referring to Fig. 2 of the drawings, the saw 11 is herein held on the end of the shaft 5 by means of a suitable mounting in the form of a sleeve having a web 17 screwed to the end of shaft 5 and provided with the longitudinal slots 19 dividing the cylindrical body of the sleeve into a plurality of arms 21. The sleeve normally fits the interior of the saw with a close sliding fit and the arms 21 may be expanded to grip the saw and for this purpose the outer ends thereof may be interiorly bevelled, as shown in Fig. 2, to cooperate with an expanding cone in the form of a plate 23 having a correspondingly bevelled edge fitting between the ends of the arms. The plate 23 may be loosely mounted between the head 25 of a bolt 27 and suitable nuts 29 on the bolt and the bolt 27 may tap into the end of the shaft 9. It will be clear from Fig. 2 that if the bolt is turned by means of a wrench applied on the head 25 the plate 23 may be drawn toward the right and the arms 21 will be pressed outwardly into gripping relation to the saw and in particular that they may engage the wall of the saw closely adjacent to the toothed edge thereof.

Figure 3:
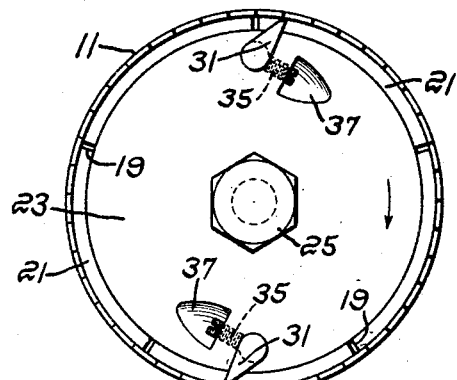
Fig. 3 is an end elevation of Fig. 2 as seen from the left.

Suitable means are provided to break up the chip which is sawed out of the heel blank and the plate 23 provides a convenient mounting for cutters 31 located adjacent the end of the saw and having shanks received in openings or sockets 33 in the plate 23, the cutters being clamped therein (see Fig. 3) by means of set screws 35 to which access may be had through depressions 37 in the face of the plate 23.

It will be noted that the plate 23 forms a wall across the interior of the tube of the saw, there being a substantially imperforate wall across the tube at a slight distance from the edge of the saw, broken only by the narrow slots 19 which separate the tongues 21 one from another. One of the objections to the use of tubular saws for heel breasting work has been that the interior of the saw filled up and became clogged with saw-dust. Here, on the contrary, there is no opportunity for saw-dust to collect and stick as it is readily discharged from the shallow space to the left of the plate 23 in Fig. 2 and it may be drawn away by the usual exhaust fans as soon as formed with little danger of its clogging any of the working parts.

The mounting of the saw 11 in the manner described is exceedingly secure. As the saw is sharpened from time to time and the body thereof shortened, it may nevertheless be still firmly held and the saw may be used for a long time before it is necessary to discard the same. As the saw is gripped closely adjacent to the cutting edge with a substantially uniform outward pressure, the projecting portion is held very firmly and stiffly with no opportunity for it to wabble in action and thus a smooth cut or kerf is provided requiring no additional finishing operations. Since the sleeve is of considerable size and volume and is pressed into firm engagement with the interior of the saw throughout its circumference, it provides for the rapid dissipation of heat from the edge of the saw, permitting the same to be run at high speed without danger of overheating.

I have described in detail the particular form of my invention herein illustrated in order that the specific mechanical structure might be readily understood. Obviously, however, the structure may be widely varied from that shown without departing from the spirit of the invention. What I claim as new and desire to secure by Letters Patent I shall express in the following claims.

Claims:

1. In a machine of the class described, in combination with a tubular saw, a mounting therefor adapted to be received within the same and having means expansible into gripping relation to the interior of the saw, said mounting also comprising an end plate forming a wall across the interior of the tube and cutters mounted on said plate.

2. In combination with a tubular saw, a split sleeve to enter the same, an expanding cone for the sleeve having a base adapted to form a wall across the interior of the tube and cutters mounted on the base.

3. In a machine of the class described, in combination with a tubular saw, a plate received within the tube forming a substantially imperforate wall at the base of the working edge of the saw to exclude saw-dust and means carried by said plate to disintegrate the chip at one side of the kerf.

4. In combination with a tubular saw, a mounting insertible in the same and along which the saw may be adjusted throughout its length, said mounting having at its distal end a gripping portion adapted to engage substantially continuously with an annular zone of the interior wall of the saw closely adjacent its edge and means for expanding the same to grip the same with substantially uniform outward pressure.

5. In combination with a tubular saw, a mounting slidable within the same and expansible adjacent its distal end to grip the interior wall of the saw closely adjacent the cutting edge thereof and presenting at said distal end a plate closely fitting the interior wall of the saw and providing a substantially imperforate annular wall at the rear of the edge thereof.

6. In combination with a tubular saw, a mounting for the same comprising a split sleeve providing an annular series of yieldable fingers cooperating with the interior wall of the saw, and an expanding cone adapted to enter between the fingers from the distal side thereof and presenting a substantially imperforate wall across the interior of the saw.

7. In combination with a tubular saw, a mounting for the same comprising a split sleeve providing an annular series of yieldable fingers cooperating with the interior wall of the saw and having their ends tapered radially outwardly and toward the distal ends thereof, and an expanding cone adapted to enter between the fingers from the distal side thereof and cooperating with the tapered portions of the same to press them into clamping engagement with the saw adjacent the cutting edge thereof.

In testimony whereof, I have signed my name to this specification.

NICHOLAS L. GULLIFORD.